June 29, 1965 J. RABINOW 3,191,490

MULTI-LEVEL TRANSPARENCY PROJECTOR FOR SEARCHING STORED DATA

Filed Nov. 30, 1961 2 Sheets-Sheet 1

INVENTOR.
Jacob Rabinow
BY Joseph A. Genovese &
Max L. Libman

INVENTOR.
Jacob Rabinow
BY Joseph A. Genovese &
Max L. Libman

United States Patent Office 3,191,490
Patented June 29, 1965

3,191,490

MULTI-LEVEL TRANSPARENCY PROJECTOR FOR SEARCHING STORED DATA

Jacob Rabinow, Takoma Park, Md., assignor, by mesne assignments, to Control Data Corporation, Minneapolis, Minn., a corporation of Minnesota Filed Nov. 30, 1961, Ser. No. 156,056
3 Claims. (Cl. 88—24)

This invention relates to optical projection systems and particularly to projection systems used for viewing transparencies. My invention is primarily useful for display images of transparencies containing "line information" i.e. numbers, letters, line drawings, codes, etc, such as alpha-numeric and graphic information composed of lines.

The term "transparency" as used herein means any mostly transparent and partly opaque manifestation (usually photographic), or fraction thereof, whose image(s) are capable of being displayed (or otherwise used) by optical means.

My invention facilitates the retrieval of stored data, such as in "Microfilm" systems, although the principles of my invention may be applied in other fields. Thus, the following description deals principally with "Microfilm" systems, although my invention is not limited thereto.

There are a number of photographic data storage systems in current use. For example, some use strip films, ordinarily on reels, where each strip contains a comparatively large number of transparency frames. The data retrieval procedure usually involves selecting the proper reel, placing it in a viewer and operating the viewer transport to either search for the desired frame or move the film strip to the correct position in those cases where the reel and frame number are known beforehand. Another system uses cards with transparency inserts. In such a system the cards are ordinarily filed in face-to-face alignment. Usually the card itself has edge or area code apertures for different reasons, one of which is to store data associated with the transparencies.

Another data storage system uses cards with notation areas thereon, and transparencies are attached along one edge of the card. This system has been adopted for storing land grants, deeds, land patents, etc., in transparency form with room for notations on the surfaces of the cards. When filed, the cards are in a face-to-face realtionship so that all of the transparencies of the cards are similarly arranged. Another method of storing data by means of transparencies is to have the transparencies made as slides and store them on rods and/or in trays. In either case the transparencies are in face-to-face relationship until used. When used, they are removed from the rod or tray and individually viewed.

The above conventional systems have been mentioned because they differ appreciably from each other, and yet, the principles of my invention apply equally well to each of the above conventional storage systems. The objective of my invention is to materially facilitate displaying, photographing, etc., the data on selected transparencies which are stored in any of the above ways (or in other ways) by eliminating the necessity of removing the transparencies from their group.

The principle of my invention is to project the image of any one of a group of transparencies arranged one behind the other, for example, in face-to-face relationship. The transparencies are said to be in face-to-face alignment, but this does not necessarily imply that the transparencies are in contact with each other. They may be spaced a reasonable distance apart or may be in physical contact, this being particularly practical where the transparencies are on glass instead of the more common acetate (or the equivalent) film.

More specifically, I have found that it is entirely possible and practical to have a group of transparencies with each transparency juxtaposed to the adjacent one, and focus a projection (or microscope) lens system on any transparency of the group, without physically removing the desired transparency from the group for viewing. There are two principal ways of doing this; (*a*) adjusting the lens system so that the image-plane in focus is at any selected level of the group, and (*b*) adjusting the entire group of transparencies with respect to the projection lens system for the same purpose. In a sense, the projection lens system "looks through" any transparency between the image-plane which is in focus, and the projection lens. The transparencies which are so located, are out of focus and their images do not appear as such on the projection screen or the like. The only visible effect of the out-of-focus transparencies is to reduce the light of the background of the in-focus image.

Accordingly, a more specific object of the invention is to provide a projection system for the image of a selected transparency of a group where the group includes transparencies in juxtaposition and only the selected transparency is in focus.

Another object of my invention is to provide a data retrieval system for viewing, photographing, reproducing, etc., the iniformation of a selected transparency in a group without removing the transparency from the group. This may be achieved by "looking through" the group to the level of the desired transparency while the entire group remains in storage (on a rod, in a tray, etc.). This may also be achieved by removing an entire group, for instance all of the transparencies on one support or in one assembly or held by one clamp, and "looking through" the group to the plane of the desired transparency. The same procedure can be followed for searching, i.e. looking at successive, juxtaposed transparencies of the group.

As will be described, various embodiments of my invention may be used to project images of transparencies at selected levels in a group of transparencies, regardless of the configuration of the transparencies or their holders. For instance, the transparencies may be in strip-film form, as parts of or attached to cards, or as individual slides.

Other objects and features of importance will become apparent in following the description of the illustrated forms of the invention.

FIGURE 1 is a diagrammatic view showing a group of transparencies capable of being moved with respect to a projection lens to bring any one of the transparencies into focus. This view shows a few of the light rays from the object to the image which appears on a screen.

FIGURES 1*a*–1*d* inclusive show the various adjustments of the group of transparencies with respect to the lens in order to locate a selected transparency at the focus of the lens.

Figure 1:
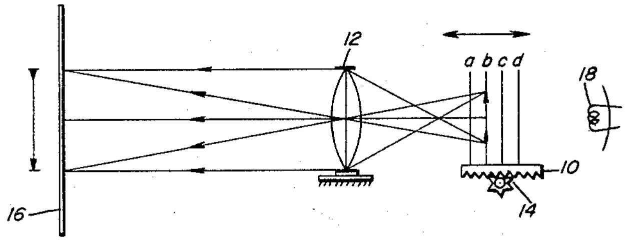
Figure 1A:
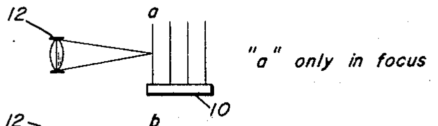
Figure 1B:
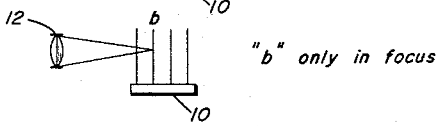
Figure 1C:
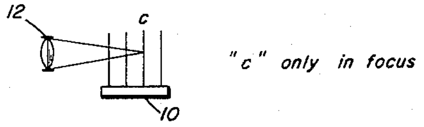
Figure 1D:
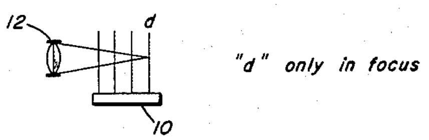

Attention is directed first to FIGURES 1–1*d* inclusive. A group of transparencies *a*–*d* inclusive is shown in face-to-face relationship. The transparencies are mounted on a carrier 10 capable of being adjusted toward and away from projection lens 12. The projection lens diagrammatically represents any conventional means to form an image of an object. Conventional means may be used for moving carrier 10, and therefore I have shown rack and pinion 14 at the lower edge of the carrier. While I discuss projection systems, it should be understood that direct viewing mechanisms can also use my invention.

With the relationship of transparencies and lens as in FIGURE 1, transparency *b* is in focus as indicated by the object-arrow. The light rays from the various points of the image-plane define a projected image on screen 16 in a manner which is self-explanatory from inspection of FIGURE 1. In this form of my invention the transparencies are back-lighted by a light source 18.

FIGURE 1*a* shows that by moving the carrier to the right (from the position shown in FIGURE 1) transparency *a* is in focus and the others are not. FIGURES 1*a*–1*d* inclusive illustrate how transparencies *a, b, c* and *d* respectively are individually moved into focus by movement of the entire group of transparencies. When one of the transparencies within the group is in focus, for instance as shown in FIGURES 1–1*d*, the transparency or transparencies between the lens and the image-plane are out of focus so that their only effect in the projected image on screen 16 is light attenuation. The amount of attenuation depends on what percentage of the area of transparencies are dark. In actual practice, printed material covers only a small percentage of the area of the sheet. A transparency, of course, has the same small percentage whereby the majority of the light passes through each transparency.

Figure 2:
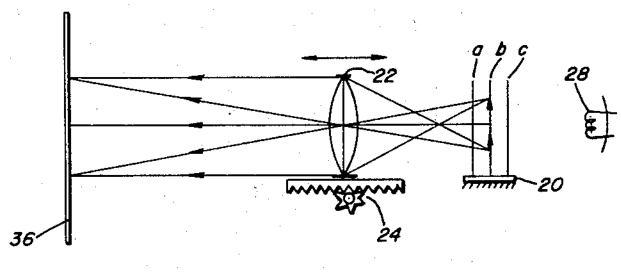
FIGURE 2 is a view similar to FIGURE 1, the difference being that the group of transparencies is fixed and the lens system is adjustable with respect thereto.

FIGURE 2 shows another form of my invention. The only difference is that the group of transparencies *a, b* and *c* are mounted on a stationary carrier 20 in front of light source 28, and the projection lens system 22 is movable toward and away from the group of transparencies. Thus, the lens system 22 is in a lens carrier having means, diagrammatically shown as rack and pinion 24, to move the lens toward and away from the group of transparencies. The image of the selected transparency on the screen 36 is formed in the same manner as the image on screen 16. The optics involved in FIGURE 2 are exactly the same as those of FIGURE 1. An advantage of my system (FIGURE 1 or FIGURE 2) is that I can have a different set of information on each side of the same transparency, which is not practical in ordinary "through-projection" systems.

Figure 3:
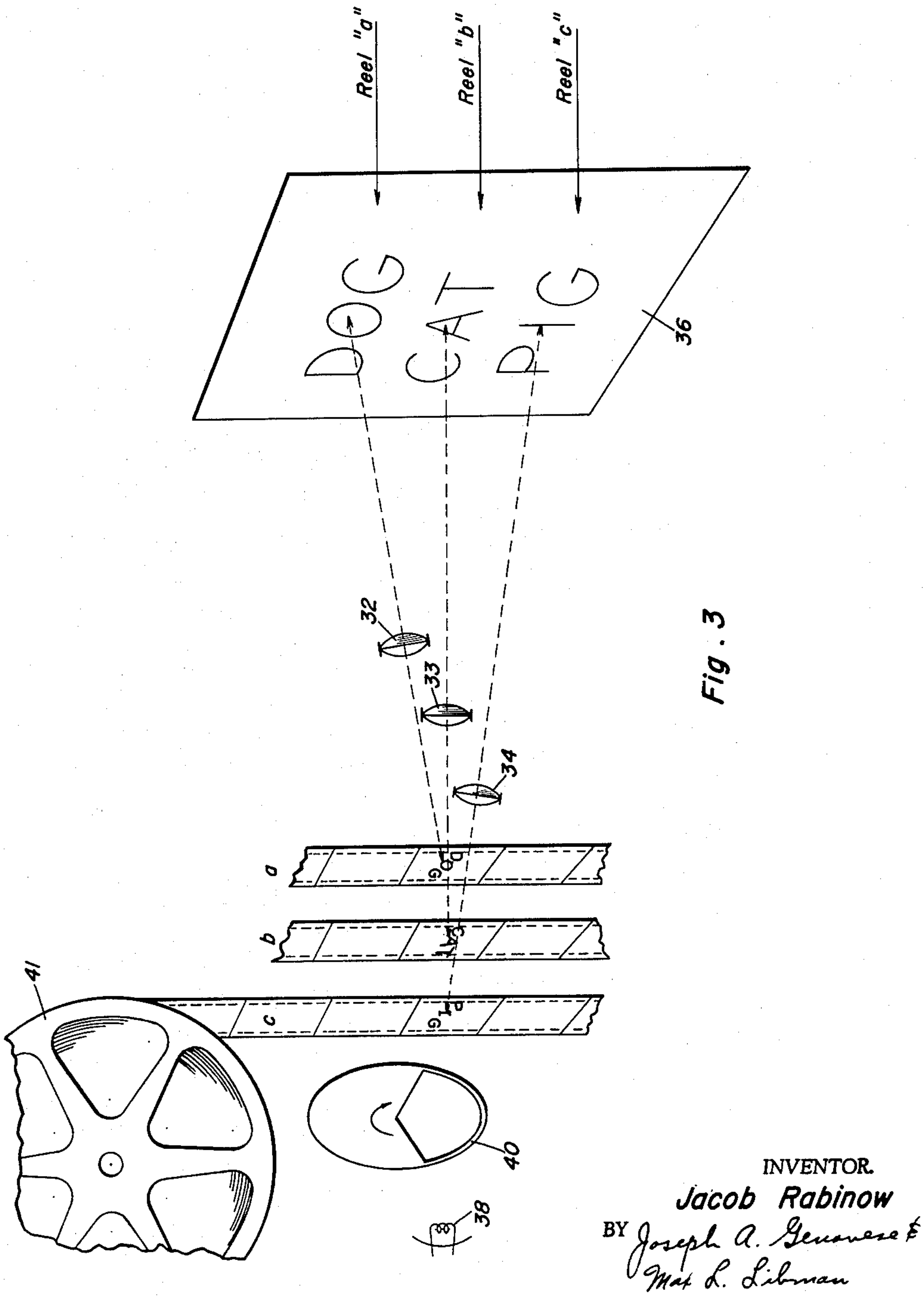
FIGURE 3 is a fragmentary perspective view showing transparencies in the form of strip film ordinarily stored on reels and further showing the alternative of using my system of "looking through" transparencies where neither the lenses nor the transparencies are adjusted with respect to each other.

FIGURE 3 shows transparencies as individual frames of strips of film such as stored on reels. This form of my invention also shows a further modification. I have three fixed lens systems 32, 33 and 34, which may be arranged one above the other or side-by-side. The three lenses could be substituted by a single movable lens system as shown at 22 in FIGURE 2. With the three-lens system, though, no adjustment of the lenses nor displacement of the transparencies toward and away from the lenses are required. Instead, the focus of lens 34 is on the image plane of transparency *c*; the focus of lens 33 is on the image plane of transparency *b*; and the focus of lens 32 is on the image plane of transparency *a*. Thus, the images of the three transparencies will be concurrently projected on screen 36 so that the three film strips may be simultaneously investigated for greater speed. The operator, of course, will know which image applies to the individual reels by the position of the image on the screen 36.

Source 38 of illumination is arranged to back-light the strips *a*–*c*. A light shutter 40 (shown schematically) is interposed between the transparencies and the source of illumination, and when a shutter is used, it is operated in synchronism with the indexing of the film strips on the reels, e.g. reel 41. The shutter 40 is conventional and operates in the usual way. Of course the necessity of the shutter depends on the type of transport used for the film strips. If they are to be examined frame-by-frame as a motion picture projector, the light shutter is desirable. If the film strips are simply moved by film transports (not shown) to a predetermined or preselected position such as when it is known beforehand that a predetermined reel and frame should be examined, shutter 40 is not required.

Summarizing, transparencies in any form, e.g. as frames, as individual slides, as attachments to or portions of cards, etc., may be investigated by my system considerably more expeditiously than by current methods. I can have the transparencies stored in groups, even when a group consists of film strips as shown in FIGURE 3, and investigate the transparencies, e.g. project an image of a selected transparency at any level within the group, without taking them out of storage or otherwise individually handling the separate transparencies or reels thereof.

It is understood that the illustrated embodiments of my invention are given by way of example only. Many changes, modifications and alterations may be resorted to without departing from the protection of the following claims. For instance, the transparencies are shown in juxtaposition and slightly spaced. They may be in contacting or non-contacting relationship depending on the thickness of the base material of the transparencies and on the design of the lens system used in my projector or viewer.

I claim:

1. In a display system for a plurality of transparencies juxtaposed in face-to-face relationship to each other, a source of light to illuminate said transparencies, first optical image-forming means directed toward the faces of the transparencies and having a focus at a first image-plane occupied by a selected transparency to form an image of at least a portion of the transparency located at said image-plane, and second optical image forming means having a focus at a second image-plane behind said first image-plane, so that said first and second means concurrently provide images of transparencies arranged one behind the other.

2. The display system of claim 1 wherein said transparencies are frames of strip film.

3. In a display system to facilitate searching and displaying data stored in transparencies arranged face-to-face as a group, said transparencies having alpha-numeric and graphic information composed of lines with the thickness of the lines being a small fraction of the interface distance between transparencies of said group, each transparency being complete of itself and informationally independent of the adjacent transparencies, and the information of each transparency being two dimensional while the spacing of the transparencies defines a third dimension, a light source directing light through said group of transparencies, optical image forming means in optical alignment with said group of transparencies and having a focus at an image plane occupied by one of said transparencies of the group, and means to search said group in said third dimension by providing relative motion between said image forming means and the entire group of transparencies in a manner such that any selected transparency of said group occupies said image plane at said focus and becomes in-focus while the remaining transparencies of said group are out of focus causing the major portion of the light to pass therethrough owing to said remaining transparencies being out of focus, and also owing to said transparencies having information composed of lines with thicknesses a small fraction of said interface distance.

References Cited by the Examiner

UNITED STATES PATENTS

| | | | |
|---|---|---|---|
| 591,153 | 10/97 | Berger | 88—32 |
| 2,281,033 | 4/42 | Garity | 88—24 |

FOREIGN PATENTS

| | | |
|---|---|---|
| 1,013,895 | 8/57 | Germany. |
| 125,459 | 4/19 | Great Britain. |

LEO SMILOW, *Primary Examiner.*

EMIL G. ANDERSON, *Examiner.*